United States Patent [19]

Sakamoto

[11] Patent Number: 4,639,648
[45] Date of Patent: Jan. 27, 1987

[54] THREE-PHASE BRUSHLESS MOTOR

[75] Inventor: Satoshi Sakamoto, Tokyo, Japan

[73] Assignee: Sony Corporation, Tokyo, Japan

[21] Appl. No.: 822,159

[22] Filed: Jan. 24, 1986

Related U.S. Application Data

[63] Continuation-in-part of Ser. No. 654,004, Sep. 12, 1984, Pat. No. 4,585,979.

[30] Foreign Application Priority Data

Feb. 18, 1985 [JP] Japan .................................. 60-29503

[51] Int. Cl.$^4$ ........................................... H02K 29/08
[52] U.S. Cl. ................................. 318/254; 318/138; 318/439; 310/68 R
[58] Field of Search ....................... 318/138, 254, 439; 310/68 R, 156, 268

[56] References Cited

U.S. PATENT DOCUMENTS 4,260,920 4/1981 Nakamura et al. ........... 310/68 R X
4,578,606 3/1986 Welterlin ......................... 318/254 X
4,585,979 4/1986 Sakamoto et al. .................. 318/254

FOREIGN PATENT DOCUMENTS

54-0716 1/1979 Japan .................................. 318/254

Primary Examiner—William M. Shoop, Jr.
Assistant Examiner—Bentsu Ro
Attorney, Agent, or Firm—Lewis H. Eslinger; Alvin Sinderbrand

[57] ABSTRACT

A three-phase brushless motor in which two electromagnetic transducer elements for detecting the rotational position of a rotor are disposed so as to produce a composite signal having a phase difference of 120° relative to the output signals from the electromagnetic transducer elements, and the output signals from the two electromagnetic transducer elements and the composite signal are used to determine drive currents fed to the stator coils. The rotor includes auxiliary magnetic poles having opposite polarities to those of main magnetic poles and are disposed in the rotor opposite the electromagnetic transducer elements at positions with an electrical angle of ±45° from the boundary between respective North poles and South poles of the main magnetic poles, whereby waveforms of the composite signal and the output signals from the electromagnetic transducer elements have a steep slope at zero crossing points.

19 Claims, 22 Drawing Figures

THREE-PHASE BRUSHLESS MOTOR

This application is a continuation-in-part of copending application Ser. No. 654,004 filed Sept. 12, 1984, now U.S. Pat. No. 4,585,979, of which I am inventor and which is assigned to the assignee hereof.

BACKGROUND OF THE INVENTION

1. Field of the Invention

The present invention relates generally to a three-phase brushless motor and, more particularly, to a three-phase brushless motor particularly adapted for audio and video equipment.

2. Description of the Background

There have been proposed heretofore flat, miniaturized three-phase brushless motors in which the stator coils are distributed uniformly about a stator plate and in which the coils are connected either in series or parallel. Some sort of electromagnetic transducer is employed to sense the relative rotational position of the magnetic poles on the rotor and produce appropriate switching signals so that the proper currents can flow through the coils arranged on the stator. One kind of heretofore proposed brushless three-phase motor involves the use of three such electromagnetic transducers, however, this causes a problem when it is desired to miniaturize the motor because the positional accuracy of the transducers is critical and, also, the transducers occupy more than a nominal physical space on the stator plate.

To overcome this drawback, a brushless three-phase motor has been proposed in which only two electromagnetic transducers are employed, with a resistive summing network used to provide a third input for the three phases of the stator windings. In that situation, a different problem arises in that the waveforms of the electromagnetic transducer elements are flattened and saturated so that the slope of the summed or composite signal at the zero crossing is made gradual, thereby leading to an increase in rotational torque ripple of the motor.

In copending U.S. patent application Ser. No. 654,004 filed Sept. 12, 1984 and assigned to the assignee hereof, of which this present application is a continuation in part, portions of oppositely poled elements are arranged on the main magnetic poles in an effort to increase the slope of the electromagnetic transducer output signals at the zero crossing points and thereby decrease or suppress rotational torque ripple. Nevertheless, the ripple is not suppressed to an optimum extent, and the previously proposed approaches all require high accuracy and correlation between the several electromagnetic transducers employed.

OBJECTS AND SUMMARY OF THE INVENTION

Accordingly, it is an object of the present invention to provide a three-phase brushless motor that can eliminate the above-noted defects inherent in the prior art.

Another object of this invention is to provide a three-phase brushless motor that supplies an accurate drive current to the stator coils so that rotational torque ripple is suppressed.

It is another object of this invention to provide a three-phase brushless motor that can reduce rotational torque ripple even though variation exist in the characteristics of at least two magnetic transducers elements and the positional accuracy thereof.

It is a further object of this invention to provide a three-phase brushless motor that is suitable for use with a video tape recorder, an audio tape recorder, a phonograph turntable, and the like.

According to one aspect of the present invention, a three-phase brushless motor is provided in which two electromagnetic transducer elements are provided to detect the rotational position of a rotor and in which the electromagnetic transducer elements are disposed on a stator so as to produce a composite output signal having a phase difference of 120° relative to the output signals of the respective electromagnetic transducer elements. The outputs from the electromagnetic transducer elements are fed to a control signal generator that produces drive current signals fed to the stator coils to provide rotational drive of the motor. In such three-phase brushless motor, auxiliary magnetic poles having opposite polarity to those of main magnetic poles are disposed on the vicinity a portion of the rotor which is in opposing relationship to the electromagnetic transducer elements mounted on the stator, and are positioned having an electrical angle of substantially ±45° from the boundaries between respective North and South poles of the main magnetic poles, so that waveforms of the composite signals and the output signals from the electromagnetic transducer elements have a steep slope at the zero crossing points.

According to the three-phase brushless motor of the present invention, because the auxiliary magnetic poles are of the opposite polarity to those of the main magnetic poles and are disposed in the vicinity of the opposing portion of the rotor relative to the electromagnetic transducer elements at a position with an electrical angle of substantially ±45° from the boundary between the North pole and the South pole of the main magnetic poles, the waveforms of the composite signal and the output from the transducers themselves will have a steep slope at the zero crossing points. Even if the various characteristics of the electromagnetic transducer elements, as well as the positional accuracy thereof, have a typical variation, rotational torque ripple is still satisfactorily suppressed.

The above and other objects, features, and advantages of the present invention will become apparent from the following detailed description of illustrative embodiments thereof to be read in conjunction with the accompanying drawings, in which like reference numerals represent the same or similar elements.

DETAILED DESCRIPTION OF PREFERRED EMBODIMENTS

Figure 1:
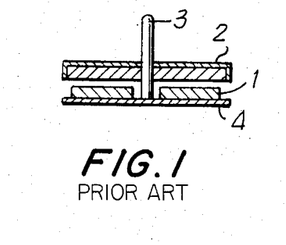
FIG. 1 is a cross-sectional representation of a brushless motor known in the prior art.
Figure 2:
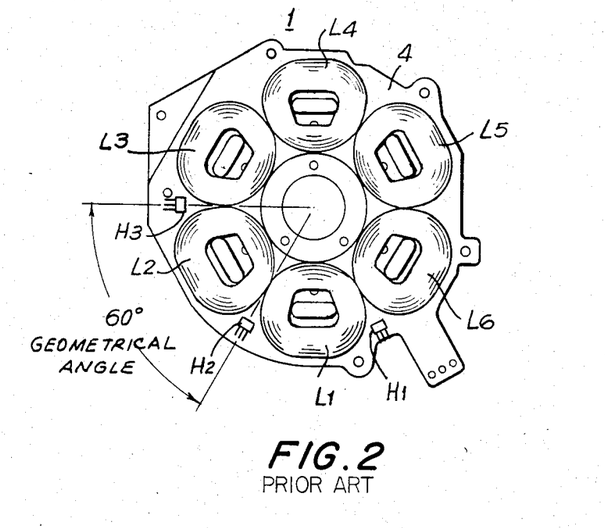
FIG. 2 is a top plan view of a stator plate showing stator windings of a three-phase brushless motor known in the prior art.

FIG. 1 is a cross-sectional representation of a known three-phase brushless motor that is particularly adapted for miniaturization and has a generally flat profile. More particularly, a stator 1 is provided in opposition to rotor 2 that is mounted on a rotary shaft 3. The stator 1 is formed on a base plate 4, which is shown in more detail in FIG. 2. As seen in FIG. 2, the stator 1 is provided with base plate 4 that is substantially circular in shape and has six flat stator coils $L_1, L_2, \ldots L_6$ mounted on base plate 4, so as to have or encompass an equal angular range, which is shown for example in FIG. 2 as being a 60° geometrical angle. The electrical arrangement relative to the several flat stator coils is such that the opposing coils are electrically connected either in series or in parallel to each other, for example, coils $L_1$ and $L_4$ are connected, coils $L_2$ and $L_5$ are connected and coils $L_3$ and $L_6$ are connected.

Figure 3:
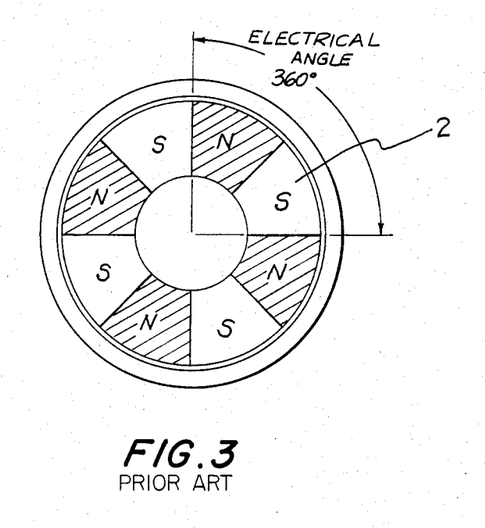
FIG. 3 is a schematic representation of a rotor for use in the motor of FIG. 1.

The details of rotor 2 are shown in FIG. 3, in which it is seen that rotor 2 is formed of a disc shaped magnetic element having eight magnetic North and South poles alternately magnetized over an equal angular range. Because this is a brushless motor, at predetermined positions on the stator, more particularly, mounted on base plate 4, are disposed electromagnetic transducer elements. More specifically, Hall effect element $H_1$ is arranged between coils $L_1$ and $L_6$, Hall effect element $H_2$ is arranged between coils $L_1$ and $L_2$, and Hall effect element $H_3$ is arranged between coils $L_2$ and $L_3$. In this embodiment, although the geometrical angle between adjacent Hall effect elements $H_1$, $H_2$, and $H_3$ is 60°, rotor 2 is provided with eight poles so that the Hall elements are disposed in a relative positional relationship having an electrical angle of 240°.

Figure 4:
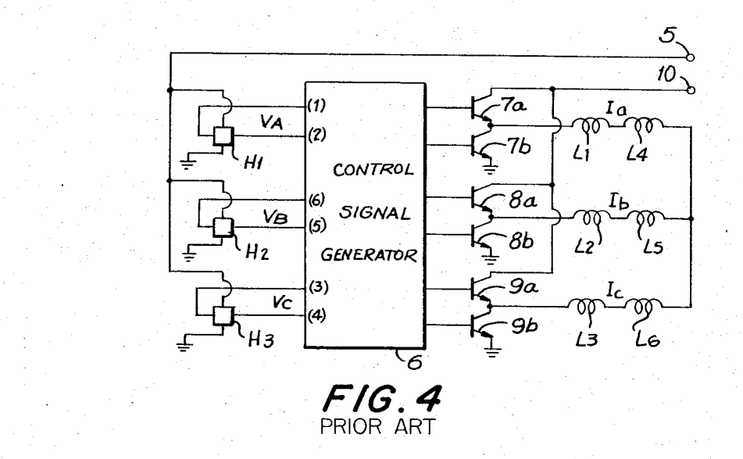
FIG. 4 is a schematic diagram of a control circuit useful in producing current pulses for driving the motor of FIG. 1.

Referring then to FIG. 4, the Hall effect elements $H_1$, $H_2$, and $H_3$ are each connected between ground and a power supply source at terminal 5, and the respective output signals from the three Hall effect elements are fed to a control signal generator 6, which in a conventional embodiment is formed as an integrated circuit. Control signal generator 6 provides six output lines connected to respective base terminals of NPN-type transistors 7a, 7b, 8a, 8b, 9a, and 9b. The collector circuits of transistors 7a, 8a, and 9a are connected to a power supply source terminal 10 that has a positive DC bias voltage applied thereto. The emitters of transistors 7a, 8a, and 9a are connected respectively to the collectors of the respective transistors 7b, 8b, and 9b. The emitter circuits of transistors 7b, 8b, and 9b are connected to ground potential. The nodes between the emitters and collectors of the respective pairs of transistors are connected to the various stator coils. More specifically, the emitter-collector node of transistors 7a and 7b is connected to a series circuit of stator coils $L_1$ and $L_2$, the emitter-collector node of transistors 8a and 8b is connected to a series circuit of stator coils $L_2$ and $L_5$, and the emitter-collector node of transistors 9a and 9b is connected to a series circuit of stator coils $L_3$ and $L_6$. The free end of coils of $L_4$, $L_5$, $L_6$ are connected together in the known manner.

Figure 5:
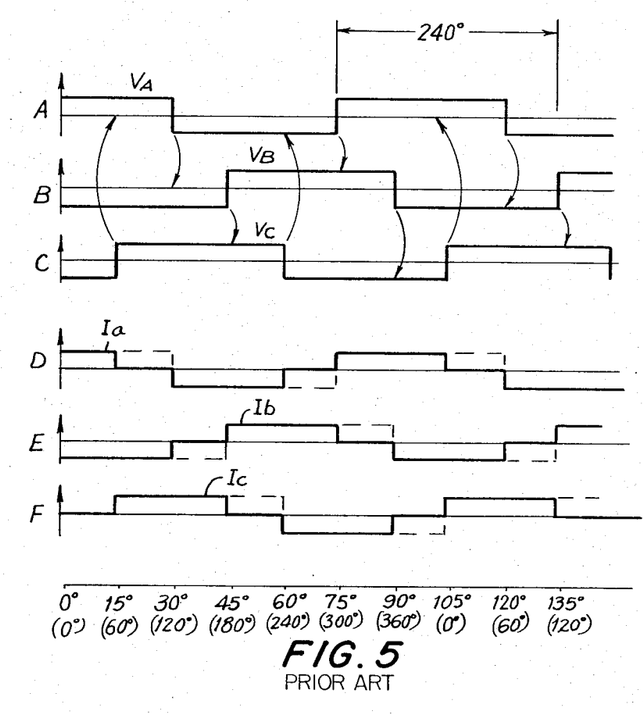
FIG. 5 is a graphical representation of various signal waveforms present in the circuit of FIG. 4.

In this embodiment, when Hall effect elements $H_1$, $H_2$ and $H_3$ produce at their outputs the squarewave signals that are sequentially different in phase by an electrical angle of 240°, as seen in FIG. 5 at waveforms A, B, and C, respectively, if the current flowing through the series circuit of stator coils $L_1$ and $L_4$ is represented as Ia, the current flowing through stator coils $L_2$ and $L_5$ is Ib, and the current flowing through stator coils $L_3$ and $L_6$ is Ic, control signal generator 6 operates to produce control signals such that the currents Ia, Ib, and Ic differ in phase by 120°. As seen in the waveforms D, E, and F of FIG. 5, from an electrical angle viewpoint these currents will become positive currents during 120°, zero currents during the next 60°, negative currents during the subsequent 120°, and zero currents during the final 60°, which sequence is then repeated.

Because the known three-phase brushless motor described above requires three Hall effect elements, a correspondingly large number of wires are required for interconnection between the Hall effect elements and the drive circuit and also the driving power required for the Hall effect elements must be considered when providing a power efficient motor. Moreover, as such three-phase brushless motor is miniaturized, the ability to accurately position the Hall effect elements becomes diminished and also the physical space within which to mount the Hall effect elements is reduced. Therefore, the above-described three-phase brushless motor having three Hall effect elements has been found to be lacking.

Figure 6:
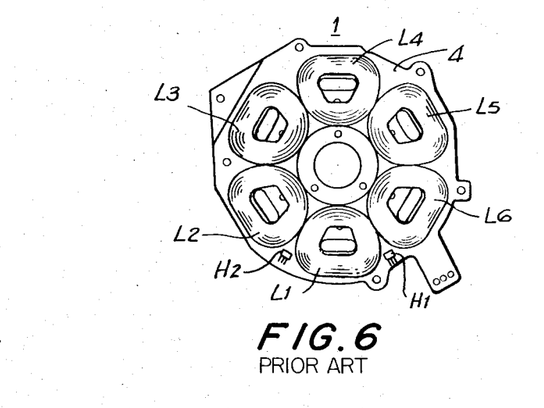
FIG. 6 is a top plan view of another embodiment of a stator plate and stator windings as known in the prior art.
Figure 7:
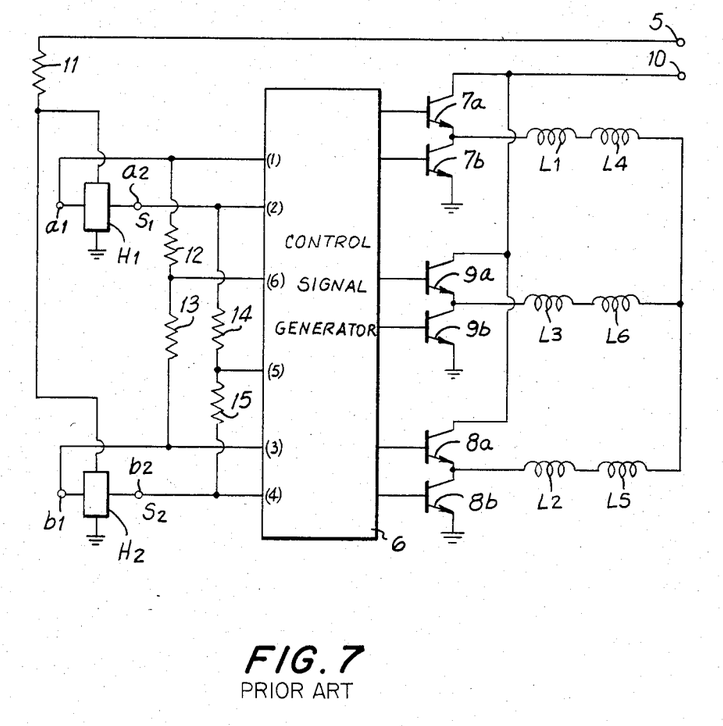
FIG. 7 is a schematic diagram of a drive circuit similar to that of FIG. 4 intended for use with the stator of FIG. 6.

Another known three-phase brushless motor is represented in FIGS. 3, 6, and 7 in which it is seen only that only two Hall effect elements, $H_1$ and $H_2$, are employed. As seen in FIG. 6, two Hall effect elements $H_1$ and $H_2$ are employed to detect the rotational position of the rotor and are disposed at positions to produce a relative electrical angle of 120° or 240°. The output signals from these Hall effect elements thereby produce a composite signal having a phase difference of 120°, relative to the output signals from each of the respective electromagnetic transducer elements $H_1$, $H_2$. This composite signal and the two output signals from the respective Hall effect elements $H_1$ and $H_2$ can then be used to supply the drive currents to the stator coils $L_1$, $L_2$, ... $L_6$. Accordingly, in an arrangement having a stator and rotor formed similarly to those in FIGS. 2 and 3, and following the teaching of the known embodiment in FIG. 6, the two Hall elements then are arranged in relative positional relationship with an electrical angle of 240° and, as seen in FIG. 7, the DC voltage is then applied at power source terminal 5 through a resistor 11 to the two Hall elements $H_1$ and $H_2$ as a bias voltage. Now in this embodiment, the output obtained from the first and second output terminals a1 and a2 of first Hall effect element $H_1$ is applied to the corresponding input terminals of control signal generator 6, and the output signal obtained at terminals b1 and b2 of Hall effect element $H_2$ is applied to the third and fourth input terminals of control signal generator 6. In order to provide the necessary signals now that the third Hall effect element has been eliminated, a resistive signal adding circuit is formed of a series circuit of resistors 12 and 13 connected between the first terminals of the two Hall effect elements and a resistive series circuit made up of resistors 14 and 15 connected between the second output terminals of the two Hall effect elements. The connections to the control signal generator 6 are then made at the nodes of the series resistive circuits and, specifically, the node between resistor 14 and 15 is connected to fifth input terminal of control signal generator 6, and the node between series resistors 12 and 13 is connected to a sixth input of control signal generator 6. In this embodiment it is assumed that all of resistors 12, 13, 14, and 15 have the same resistance value R, which is selected to be substantially greater than the resistance values of the Hall effect elements $H_1$ and $H_2$.

Now, assuming that the output voltage values at the first and second terminals a1 and a2 of Hall effect element $H_1$ are taken as Va and Va', and the output voltage at the first and second output terminals b1 and b2 of second Hall effect element $H_2$ are taken as Vb and Vb', the voltage value fed to the fifth input terminal of control signal generator 6 can be expressed as:

$$Vc = (\tfrac{1}{2})(Va' + Vb') \tag{1}$$

Similarly, a voltage value Vc' that would be supplied to the sixth input terminal of control signal generator 6 can be expressed as:

$$Vc' = (\tfrac{1}{2})(Va + Vb) \tag{2}$$

Therefore, the input signal c applied between the fifth and sixth input terminals of control signal generator 6 can be represented as:

$$c = Vc - Vc' = -(\tfrac{1}{2})(Va - Va') - (\tfrac{1}{2})(Vb - Vb') \tag{3}$$

In this case, the input signal then applied between the first and second input terminals of control signal generator 6, that is, the output signal of Hall effect element $H_1$, is represented by the following:

$$a = Va - Va' \tag{4}$$

Similarly, tne input signal applied at the third and fourth input terminals of control signal generator 6, that is, the output signal of Hall-effect element $H_2$ is represented by the following:

$$b = Vb - Vb' \tag{5}$$

Therefore, substituting the above values, it is seen that the signal applied between the fifth and sixth input terminals of control signal generator 6 can be represented as:

$$c = -(\tfrac{1}{2})(a + b) \tag{6}$$

Accordingly the signals having the waveforms represented at A, B, and C of FIG. 5 are supplied to the input side of control signal generator 6. The remaining circuit elements in the motor control system represented in FIG. 7 are connected in exactly the same fashion as described in relation to FIG. 4. Therefore, the rotor of the motor is rotated by the circuit arrangement represented in FIG. 7 exactly it was in accordance with the circuit arrangement of FIG. 4.

Because in the arrangement of FIGS. 6 and 7 the number of Hall effect elements has been reduced from three to two, the corresponding extent of interconnecting wirings has also been correspondingly reduced, and the power consumption has also been reduced, this embodiment is advantageous in miniature motor applications. Nevertheless, when a rotor in which North poles and South poles are magnetized with an equal angular spacing, as seen for example in FIG. 3, as used as rotor 2 of the three-phase brushless motor and such rotor is rotated, the waveforms of the output signals from Hall effect elements $H_1$ and $H_2$ have the upper portions thereof flattened because of saturation. This waveform distortion is represented at waveforms $S_1$ and $S_2$ at A in FIG. 8, in which the composite waveform $S_3$, that is, the signal C formed of waveforms $S_1$ and $S_2$, has a gradual inclination or slope at the zero crossing point. Therefore, the zero crossing point of the composite waveform cannot be accurately determined and it is this signal, as represented at waveform C of FIG. 8, that is fed to control signal generator 6.

Figure 8:
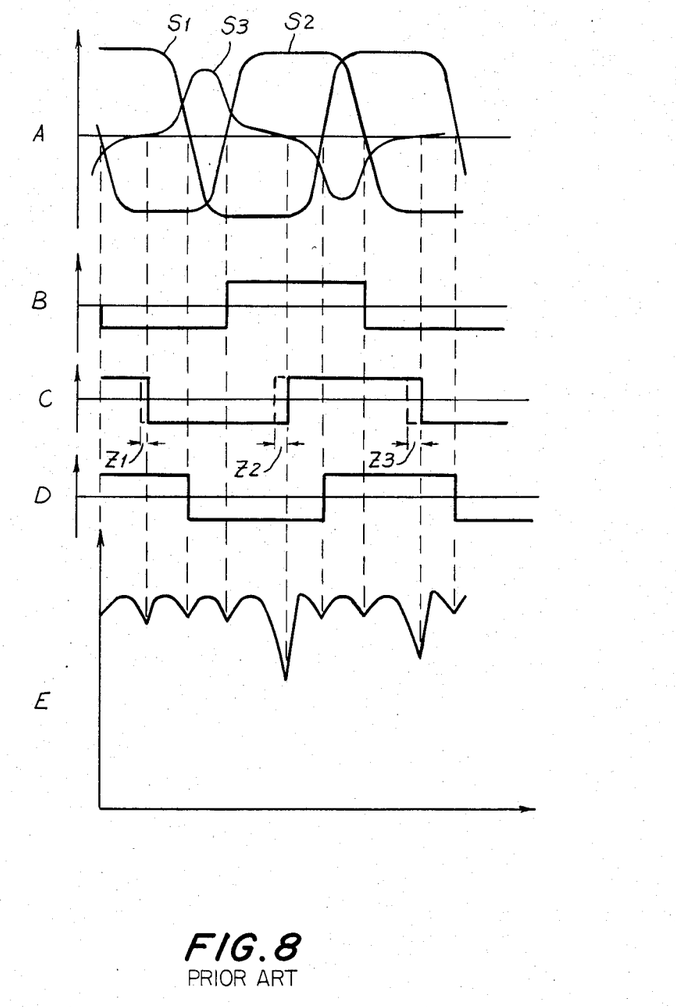
FIG. 8 is a graphical representation of various signal waveform present using the drive circuit of FIG. 7.

As seen more clearly in waveform C of FIG. 8, the composite signal C is one in which the phases at the trailing and leading edges of the square wave representation are displaced from the normal by a phase error represented at $Z_1$, $Z_2$, and $Z_3$. Waveforms B and D of FIG. 8 illustrate the waveforms obtained from output signals $S_1$ and $S_2$ of the Hall effect elements $H_1$ and $H_2$, respectively. Now, when the signals having waveforms represented at B, C and D of FIG. 8 are fed to the respective input terminals of control signal generator 6, the drive current to be supplied to stator coils $L_1$, $L_2$, ... $L_6$ are derived therefrom and the rotor is then driven accordingly, however, the unevenness of the rotation torque will become greater in the vicinity of the zero crossing points of the composite signal $S_3$, as represented by the waveform E in FIG. 8. In such case, it has been found that the rotational torque ripple is increased by more than 23.4%.

Figure 9:
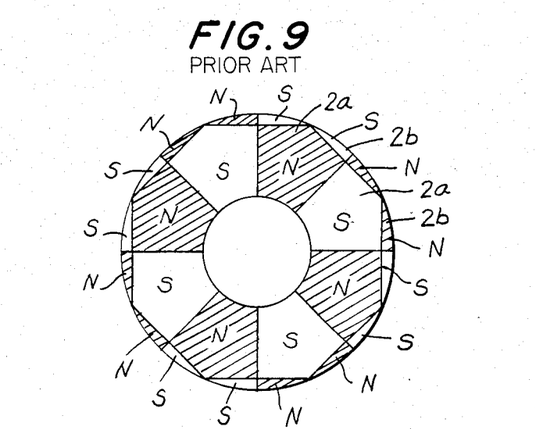
FIG. 9 is a schematic representation of a rotor for use in a three-phase brushless motor disclosed in the above-identified copending application.

To overcome the above-described disadvantageous elements of the prior art, one solution is described in U.S. patent application Ser. No. 06/654,004 filed Sept. 12, 1984 and assigned to the assignee of the present invention, in which the brushless three-phase motor is provided with a rotor as shown in FIG. 9. In this rotor four North poles and four South poles are alternately magnetized on a disc made of magnetic material with an equal angular spacing. These North and South poles then form the main North and South magnetic poles $2a$. In an embodiment disclosed in the above-identified copending application, auxiliary magnetic poles $2b$ are provided that are arranged at the respective outer peripheries of the main magnetic poles $2a$ and are provided with the opposite polarity to that of the corresponding main magnetic pole. The auxiliary poles $2b$ then are arranged to substantially pass over the electromagnetic transducers $H_1$ and $H_2$ of the stator. In the three-phase brushless motor of the above-identified application, which employs a rotor as represented in FIG. 9, two Hall effect elements $H_1$ and $H_2$, provided to detect the rotational position of the rotor, are arranged having a positional relationship with an electrical angle of 240°, and the respective output signals from these Hall effect elements when combined to form the composite will provide a composite signal having a phase difference of 120° relative to the output signals from the two Hall effect elements. Thus, the drive currents to be supplied to the stator coils $L_1, L_2, \ldots L_6$ are determined by the composite signals and the output signals from the two Hall effect elements, whereby the three-phase brushless motor is driven to rotate.

Figure 10:
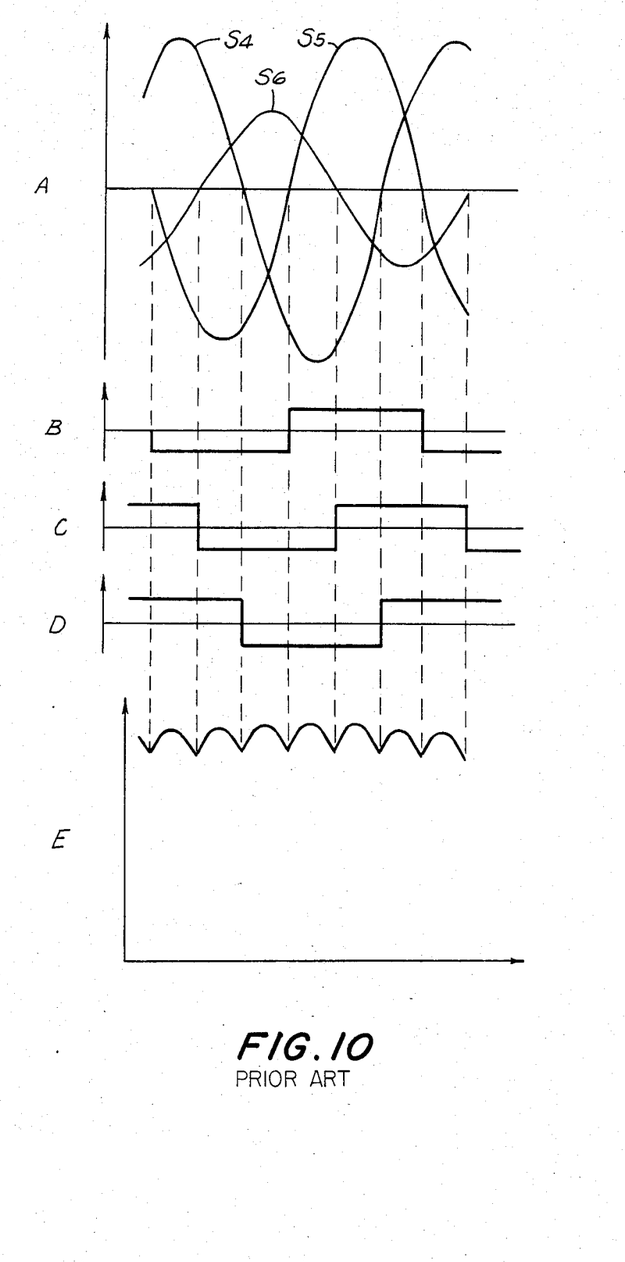
FIG. 10 is a graphical representation of signal waveforms found in a motor employing the rotor of FIG. 9.

In the case of the motor described in relation to FIG. 9, because in that embodiment the auxiliary magnetic poles $2b$ have the opposite polarity to those of the main magnetic poles $2a$ and are provided at the opposing portion of the rotor relative to the two Hall effect elements, when the rotor is rotated the waveforms of the output signals produced by the two Hall effect elements will not be saturated but will have a relatively large inclination, that is, the slope in the zero crossing vicinity, as represented by waveforms $S_4$ and $S_5$ at A in FIG. 10. Because the composite signal c, as shown in waveform $S_6$ of FIG. 10, has a relatively sharp inclination or slope at the zero crossing point, the composite signal represented in waveform C of FIG. 10 does not have the phase difference problems associated with the system described hereinabove. The waveforms of output signals $S_4$ and $S_5$ derived from the two Hall effect elements are seen at B and D of FIG. 10, and when the signals having waveforms as shown in B, C, and D are supplied to inputs of the control signal generator 6 to produce the drive currents drive the stator coils $L_1, L_2, \ldots L_6$, the rotor is rotated by such drive currents with relatively small unevenness or ripple in the rotational torque. The rotational torque ripple is quite small and is seen at waveform E in FIG. 10. Such rotational torque ripple has been found to be as low as 6.3%.

Nevertheless, in order to obtain a torque ripple as low as 6.3%, the output sensitivity, unbalanced voltages, mounting positions, and the like of the Hall effect elements must be determined with a high degree of accuracy. For example, when the unbalanced voltage of the two Hall effect elements are respectively 3.5% and 6.3%, the output difference therebetween is 10.5%. This is represented by the waveforms at A of FIG. 11, in which it is seen that the waveform $S_4'$ and $S_5'$ of the two Hall effect elements and the waveform $S_6'$ of the composite thereof, can be employed to produce a drive signal represented in waveform B in which torque ripple is increased to approximately 13.7%. If such torque ripple is increased due to the unbalanced voltages of the Hall effect elements, for example, then when the motor is employed in a video tape recorder or audio tape recorder or record player or the like, which require a high rotational accuracy and low wow and flutter, the previously proposed motor is not suitable.

Figure 12:
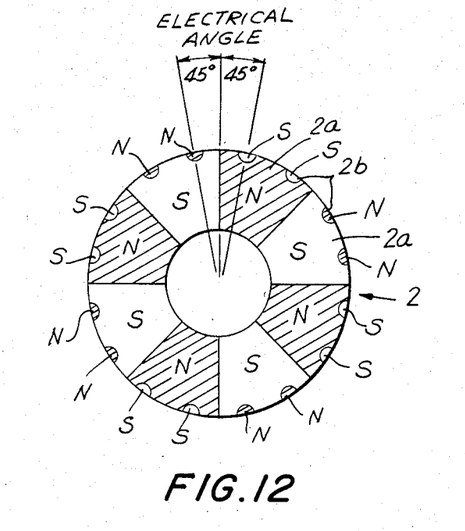
FIG. 12 is a schematic representation of a rotor for use in a brushless motor according to an embodiment of the present invention.
Figure 13:
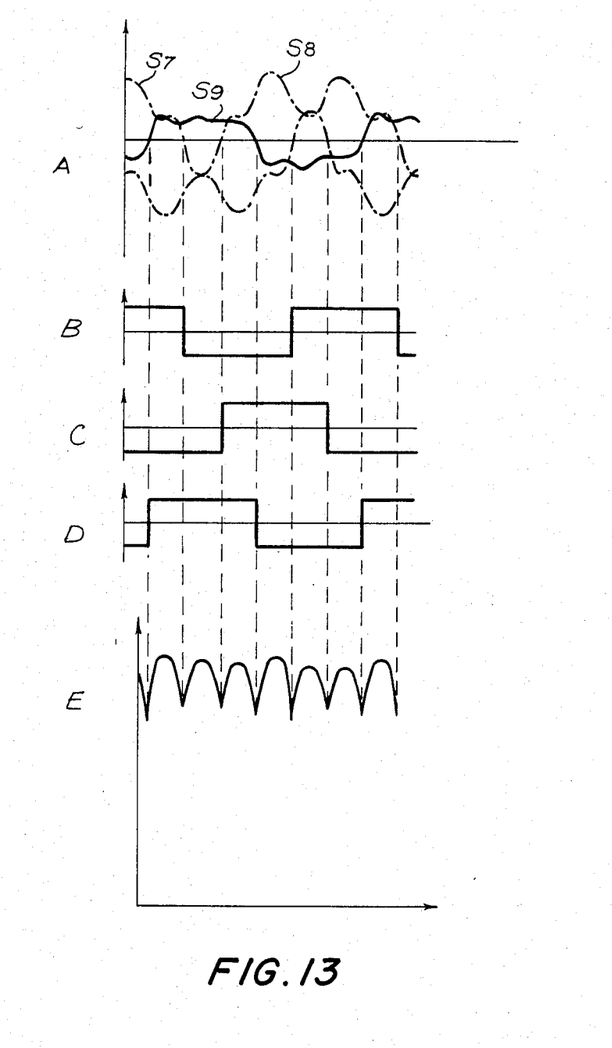
FIG. 13 is a graphical representation of various signal waveforms present in a motor employing the rotor of FIG. 12.

The present invention solves the above-described drawbacks in the heretofore proposed three-phase brushless motors and turning to FIG. 12 one embodiment of the present invention is shown. In FIGS. 12 and 13, the same reference numerals corresponding to the motors described in the preceding FIGS. are employed and further description need not be provided in detail. Referring then to FIGS. 12 and 13, the stator will first be described and will consist substantially of the stator that was described hereinabove in relation to FIG. 6 in which six coils are provided connected either pairs, either in series or in parallel, and in which two electromagnetic transducer elements, for example, Hall effect elements, are employed. As described hereinabove the Hall elements are placed in relative positional relationship having an electrical angle of 240°. The Hall effect elements and the stator coils may be connected as described hereinabove in relation to FIG. 7.

Assuming then that the stator is as shown in Fig. 6, the rotor provided by the present invention is seen in FIG. 12 in which North and South poles are formed being alternately magnetized on a disc made of magnetic material, each having an equal angular spacing. In this embodiment, main magnetic poles $2a$ and auxiliary magnetic poles $2b$ having opposite polarities to those of the main magnetic poles are magnetized on the disc at the position having an electrical angle of substantially ±45° from the boundary between the North and South poles of the eight main magnetic poles $2a$ and are arranged on the outer peripherial portions thereof. The auxiliary magnetic poles $2b$ are arranged on the periphery of the rotor so as to be in alignment and pass over the electromagnetic transducer elements that are affixed to the stator.

In this embodiment, and similar to the example of the three-phase brushless motor employing only two Hall effect elements, because the two Hall effect elements $H_1$ and $H_2$ employed to detect the rotational position of the rotor are placed in a relative positional relation having an electrical angle of 240°, the output signals from the Hall effect elements produce a composite signal having a phase difference of 120° relative to the outputs of the two Hall elements, and the drive currents to be supplied to stator coils $L_1, L_2, \ldots L_6$ are determined by the composite signal, as well as the output signals form the two Hall elements. By using a circuit similar to FIG. 7, along with the Hall elements, the three-phase brushless motor is driven to rotate.

The waveforms produced by the two Hall effect elements are shown generally in FIG. 13 and in the embodiment of FIG. 12, because the auxiliary magnetic poles $2b$, having opposite polarities to those of the main magnetic poles 2a, are disposed in the vicinity of the opposing portions of the rotor relative to the Hall effect elements at positions having an electrical angle of substantially ±45° from the boundary between the respective South and North poles of the main mgnetic pole 2a, when the rotor is rotated the waveforms of the output signals from the Hall effect elements will not be saturated but will have signal waveforms having sharp inclinations or slopes, as represented by waveforms S7 and S8 at A of FIG. 13.

Figure 11:
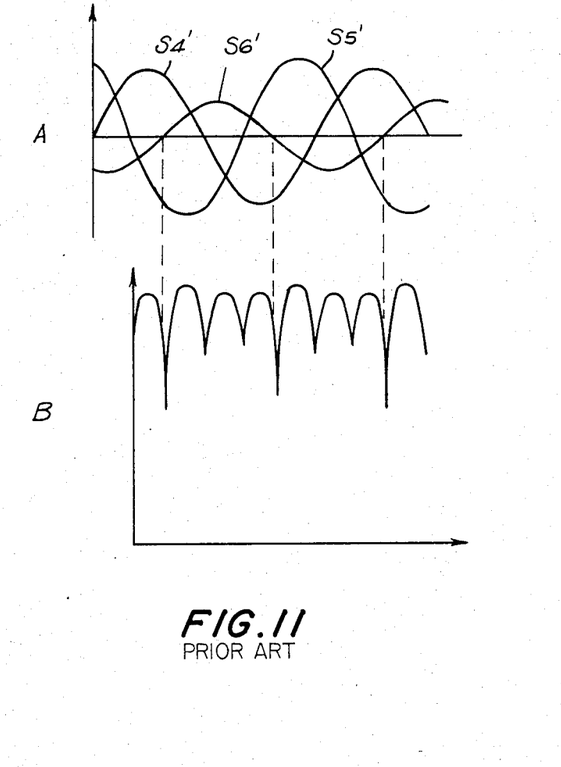
FIG. 11 is a graphical representation of signal waveforms found in a modified motor using a rotor of FIG. 9.

In waveform A of FIG. 13, signal S7 is a one-dot chain line and signal S8 is represented by a two-dot chain line, and the solid line S9 is the composite signal c formed from the waveform S7 and S8. It is clearly seen that signal S9 has a sharp slope at the zero crossing point. Accordingly, the zero crossing point is determined and the composite signal, as represented in waveform D of FIG. 13, is feed to the fifth and sixth input terminals of control signal generator 6, as shown for example in FIG. 7. The leading edge and the trailing edge of the squarewave of the composite signal, having a waveform shown at D in FIG. 13, are determined at the zero crossing points of waveform A of FIG. 13. The waveforms of output signals S7 and S8, as produced by the two Hall effect elements are shown at B and D, respectively, of FIG. 13, and the signals having waveforms B, C, and D of FIG. 13 are fed to control signal generator 6 to obtain the drive currents that are fed to the stator coils $L_1, L_2, \ldots L_6$, so that the rotor is rotated thereby. Using this embodiment, regardless of the variations in the characteristics of the Hall elements employed, the rotational torque is quite even and the torque characteristic is shown for example at waveform E of FIG. 13. A torque curve having a waveform such as seen in E in FIG. 13 has a rotational torque ripple of approximately 7.5%, whereas although this torque curve is similar to the torque curve shown at waveform B in FIG. 11, it is noted that the torque curve in which there was an unbalanced voltages of 3.5% and 6.5% in the Hall effect elements resulted in an output difference of 10.5%. The rotational torque ripple shown at B in FIG. 11 is 13.7%, thus, the present invention provides a substantial improvement thereover.

Figure 14:
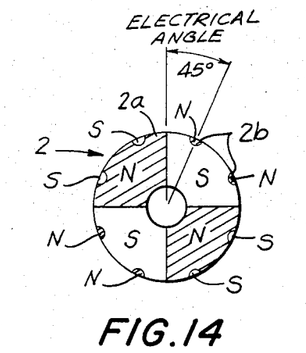
FIG. 14 is a schematic representation of a rotor for use in a three-phase brushless motor according to another embodiment of the present invention.

Another embodiment of the three-phase brushless motor according to the present invention is shown in FIG. 14, in which there are four main magnetic poles 2a and in which the auxiliary magnetic poles 2b are disposed at the outer peripheral portions of the main magnetic poles 2a at positions having an electrical angle of substantially ±45° from the boundary between the respective North poles and South poles.

Figure 15:
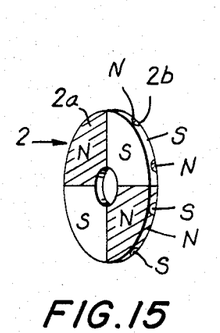
FIG. 15 is a schematic representation of a rotor for use in a three-phase brushless motor according to still another embodiment of the present invention.

In FIG. 15, another embodiment of a rotor provided according to the present invention is shown in which there are four magnetic poles and in which each main magnetic pole 2a is extended to the side surface and the auxiliary magnetic poles 2b are disposed at positions with an electrical angle of substantially ±45° from the boundary between the respective North poles and the South poles. In the embodiment of FIG. 15, the auxiliary magnetic poles 2b are only arranged in the radial surface and are not in the planar surfaces of rotor 2. The portion of rotor 2 not shown in symmetrical.

Figure 16:
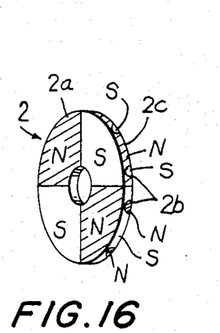
FIG. 16 is a schematic presentation of a rotor for use in a three-phase brushless motor according to yet another embodiment of the present invention in which rotational position detecting elements are provided.

FIG. 16 discloses an embodiment of the present invention in which four main magnetic poles 2a form rotor 2 and in which auxiliary magnetic poles 2b of the same polarity as main magnetic poles 2a are arranged on the radial surface of rotor 2 and are disposed at positions having an electrical angle of substantially ±45° from the boundary between respective North poles and South poles. The auxiliary magnetic poles are formed by means of a rotational position detecting main magnetic pole 2c arranged as a thin magnetic pole area on the peripherial surface of the rotor 2 and being of an opposite magnetic polarity relative to the respective main magnetic pole 2a and being displaced, for example, by an electrical angle of 180° from the main magnetic pole. In an embodiment differing from that of FIG. 16, the phase difference between the main magnetic pole 2a and the rotational position detecting main magnetic pole 2c, the electrical angle can be 60°, 120°, 240°, and 300°, which result in different amounts of the radial surface of the main magnetic poles being covered by the thin magnetic pole area that forms the detecting magnetic pole. Again, the portion of rotor 2 not shown is symmetrical.

Figure 17:
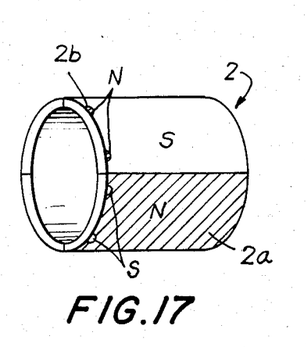
FIG. 17 is a schematic representation of a cylindrical rotor according to an embodiment of the present invention.

An example of a rotor being formed substantially cylindrically for use with a cylindrical motor is shown in FIG. 17, in which the main magnetic pole 2a is formed of four poles. In the embodiment of FIG. 17, the auxiliary magnetic poles 2b are arranged at an electrical angle of substantially ±45° from the boundary between the respective North and South poles at the end and on the side surface or cylindrical surface of the rotor 2.

Figure 18:
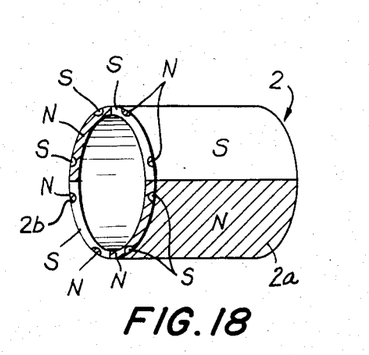
FIG. 18 is a schematic representation of a cylindrical rotor according to another embodiment of the present invention.

FIG. 18 is an embodiment of a rotor for use with a cylindrical brushless, three-phase motor in which main magnetic pole 2a is formed of four magnetic poles. The auxiliary magnetic poles 2b are arranged in the end surface of the rotor 2 and are disposed at positions having an electrical angle of substantially ±45° from the respective boundary between the respective North poles and South poles of the main magnetic pole 2a. The embodiment of FIG. 18 can be to adapted to correspond to the embodiment of FIG. 16, in which the end surfaces of the main magnetic poles 2a are covered with the rotational position detecting magnetic poles 2c having any one of the phase difference electrical angles of 60°, 120°, 180°, 240°, and 300° relative to the respective main magnetic poles 2a. The thin magnetic pole area forming the detecting magnetic pole 2c defines the auxiliary magnetic poles 2b as being disposed with electrical angles of substantially ±45° from the boundaries between the respective North and South poles of the main magnetic poles.

Figures 19, 20:
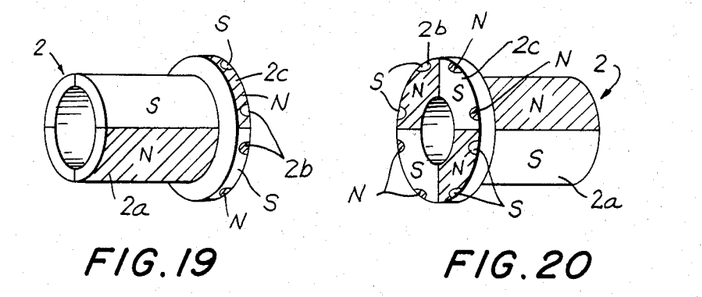
FIG. 19 is a schematic representation of a further embodiment of a cyclinder rotor according to the present invention in which a rotational position detecting element is employed.
FIG. 20 is a schematic representation of still a further cylindrical rotor motor according to the present invention.

A specialized embodiment of cylindrical rotor 2 is shown in FIG. 19, in which there are four main magnetic poles 2a and in which the diameters of the main magnetic poles 2a on the side surface and the rotational positioning detecting main magnetic poles 2c are made different from each other resulting in a diametrical step difference forming a flange and a phase difference of any one of electrical angles 60°, 120°, 180°, 240°, and 300° can be selectively obtained. Also in the embodiment of FIG. 19, the auxiliary magnetic poles 2b are exposed by the thin magnetic area 2c at positions having an electrical angle of substantially ±45° from the boundary between the respective North and South poles of the main magnetic pole 2a.

FIG. 20 is an example of an embodiment of rotor 2 in which the rotation positioning main magnetic poles 2c are disposed on the end surface of rotor 2 that has substantially the same shape as that in the embodiment of FIG. 19. In the embodiment of FIG. 20, the auxiliary magnetic poles 2b are exposed by the thin magnetic area 2c at positions having an electrical angle of substantially ±45° from the boundary between the respective North and South poles of the main magnetic poles 2a.

Figure 21:
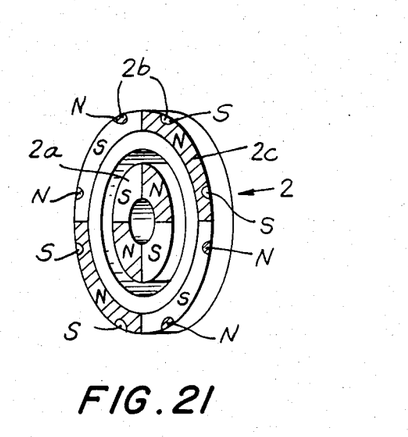
FIG. 21 is a schematic representation of a flat rotor for use in a brushless motor according to an embodiment of the present invention.

A rotor 2 for use in a flat brushless three-phase motor is shown in FIG. 21, in which there are four main magnetic poles 2a. In this embodiment, the rotational position detecting main magnetic poles 2c are concentrically formed at the outer periphery of the main magnetic poles 2a, and the auxiliary magnetic poles 2b are disposed at positions having an electrical angle of substantially ±45° from the respective boundaries between the North poles an South poles of the rotational position detecting main magnetic poles 2c. According to the embodiment of FIG. 21, it is also possible to provide a phase difference equal to any of various electrical angles such as 60°, 120°, 180°, 240°, and 300° between the main magnetic pole 2a and the rotational position detecting main magnetic poles 2c.

Figure 22:
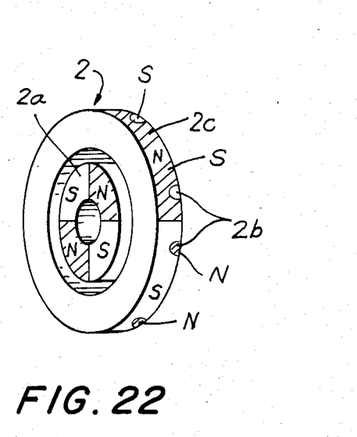
FIG. 22 is a schematic representation of a flat rotor for use in a flat three-phase brushless motor according to a further embodiment of the present invention.

FIG. 22 illustrates an embodiment of rotor 2 for use with a flat motor in which main magnetic poles 2a and the rotational position detecting main magnetic poles 2c are separated concentrically and in which the rotational position detecting main magnetic poles 2c are disposed on the side surface of the outer ring. The auxiliary magnetic poles 2b are disposed at positions having an electrical angle of substantially ±45° from the respective boundary between the North pole and South pole of the rotational position detecting main magnetic pole 2c. In this embodiment as in the embodiments above, the main magnetic pole 2a and the rotational position detecting main magnetic pole 2c may have phase differences other than the 180° as shown, for example, 60°, 120°, 240°, and 300°.

The present invention also contemplates rotors of various shapes in addition to those described above in which the main magnetic pole can serve as the rotational position detecting main magnetic pole, or the rotational position detecting main magnetic poles can be formed independently and assembled into the final structure. When the rotational position detecting main magnetic poles are prepared independently, it is possible to provide a phase difference between the rotational position detecting main magnetic pole and the main magnetic pole. Nevertheless, the auxiliary magnetic pole must be arranged to substantially pass above the Hall elements $H_1$ and $H_2$ of the stator. Additionally, the number of main poles in the rotor need not be limited to the four or eight pole embodiments described hereinabove, but other pole arrangements such as two poles, six poles, and the like can be employed. Furthermore, it is not necessary to employ Hall effect elements and other electromagnetic transducers can be employed, such as magnetic resistance elements and the like. While in the above-discussed embodiments two electromagnetic transducer elements are disposed having a relative electrical angle of 240°, a three-phase brushless motor according to the present invention can be formed using only two electromagnetic transducer provided at a position having an electric angle of 120°.

Therefore, according to the present invention described hereinabove, a three-phase brushless motor can be driven in an acceptable fashion to rotate by using only two electromagnetic transducer elements and in which the characteristics of the electromagnetic transducer elements and their assembly accuracy can have variations yet still provide a motor in which rotational torque ripple is suppressed.

The above description is provided for a various embodiments of the invention, however, it will be apparent that many modifications and variations could be effected by one skilled in the art without departing from the spirit or scope of the novel concepts of the invention, which should be determined only by the appended claims.

I claim:

1. A three-phase brushless motor in which two electromagnetic transducer elements to detect a rotational position of a rotor having a plurality of magnetic poles disposed so as to produce a composite signal having a phase difference of 120° relative to respective output signals from said two electromagnetic transducer elements, said output signals from said two electromagnetic transducer elements and said composite signal are used to determine a drive current which will be fed to a stator coil, characterized in that auxiliary magnetic poles having opposite polarities to those of main magnetic poles on said rotor are disposed on said rotor in opposing relationship to said electromagnetic transducer elements and at a positions on said rotor with an electrical angle of substantially ±45° from a boundary between respective North poles and South poles of said main magnetic poles, whereby waveforms of said composite signal and said output signals from said electromagnetic transducer elements have a steep slope at zero-crossing points.

2. A three-phase brushless motor according to claim 1, in which there are eight main magnetic poles and sixteen auxiliary magnetic poles symmetrically arranged on said rotor.

3. A three-phase brushless motor according to claim 1, in which there are four main magnetic poles and eight auxiliary magnetic poles arranged symmetrically at outer peripheral portions of said main magnetic poles.

4. A three-phase brushless motor according to claim 1, in which said rotor is formed as a cylinder and said auxiliary magnetic poles are arranged in an outer radial surface at an end of said cylinder.

5. A three-phase brushless motor according to claim 1, in which said rotor is formed as a cylinder of a first diameter and having a flange of a second diameter formed at one end and said auxiliary poles are formed on an outer radial surface of said flange.

6. A three-phase brushless motor in which two electromagnetic transducer elements to detect a rotational position of a rotor having a plurality of magnetic poles disposed so as to produce a composite signal having a phase difference of 120° relative to respective output signals from said two electromagnetic transducer elements, said output signals from said two electromagnetic transducer elements and said composite signal are used to determine a drive current which will be fed to a stator coil, characterized in that auxiliary magnetic poles having opposite polarities to position detecting magnetic poles are disposed on said rotor in opposing relationship to said electromagnetic transducer elements and at the positions on said rotor with an electrical angle of substantially ±45° from a boundary between respective North poles and South poles of said position detecting magnetic poles, whereby waveforms of said composite signal and said output signals from said electromagnetic transducer elements have a steep slope at zero-crossing points.

7. A three-phase brushless motor according to claim 6, in which said rotor further includes main magnetic poles, said position detecting magnetic poles are disposed on a radial surface of said rotor at positions displaced by an electrical angle of 180° from a corresponding main magnetic pole.

8. A three-phase brushless motor according to claim 6, in which said rotor further includes main magnetic poles, said position detecting magnetic poles are disposed on a radial surface of said rotor at positions displaced by an electrical angle of 60° from a corresponding main magnetic pole.

9. A three-phase brushless motor according to claim 6, in which said rotor further includes main magnetic poles, said position detecting magnetic poles are disposed on a radial surface of said rotor at positions displaced by an electrical angle of 120° from a corresponding main magnetic pole.

10. A three-phase brushless motor according to claim 6, in which said rotor further includes main magnetic poles, said position detecting magnetic poles disposed on a radial surface of said rotor at positions displaced by an electrical angle of 240° from a corresponding main magnetic pole and being of the opposite polarity to said auxiliary magnetic poles.

11. A three-phase brushless motor according to claim 6, in which said rotor further includes main magnetic poles, said position detecting magnetic poles are disposed on a radial surface of said rotor at positions displaced by an electrical angle of 300° from a corresponding main magnetic pole.

12. A three-phase brushless motor according to claim 6, in which said rotor further includes main magnetic poles, said position detecting magnetic poles are disposed on an end surface of said rotor and are displaced by an electrical angle of 180° from a corresponding main magnetic pole.

13. A three-phase brushless motor according to claim 6, in which said rotor further includes main magnetic poles, said position detecting magnetic poles are disposed on an end surface of said rotor and are displaced by an electrical angle of 60° from a corresponding main magnetic pole.

14. A three-phase brushless motor according to claim 6, in which said rotor further includes main magnetic poles, said position detecting magnetic poles are disposed on an end surface of said rotor and are displaced by an electrical angle of 120° from a corresponding main magnetic pole.

15. A three-phase brushless motor according to claim 6, in which said rotor further includes main magnetic poles, said position detecting magnetic poles are disposed on an end surface of said rotor and are displaced by an electrical angle of 240° from a corresponding main magnetic pole.

16. A three-phase brushless motor according to claim 6, in which said rotor further includes main magnetic poles, said position detecting magnetic poles are disposed on an end surface of said rotor and are displaced by an electrical angle of 300° from a corresponding main magnetic pole.

17. A three-phase brushless motor according to claim 6, in which said rotor is formed as a cylinder of a first diameter and having a flange of a second diameter formed at one end, said auxiliary poles are formed in an outer radial surface of said flange.

18. A three-phase brushless motor according to claim 17, in which said rotor further includes main magnetic poles, said position detecting magnetic poles are disposed on said radial surface of said flange and are displaced by a predetermined electrical angle from a respective main magnetic pole.

19. A three-phase brushless motor according to claim 6, in which said rotor is formed as a cylinder of a first diameter and having a flange of a second diameter formed at one end, said auxiliary poles are formed on an outer end surface of said flange, said rotor further includes main magnetic poles, said position detecting magnetic poles are disposed on said outer end surface of said flange and are displaced by a predetermined electrical angle from a respective main magnetic pole.

* * * * *